United States Patent [19]

van Loo, Jr. et al.

[11] Patent Number: 5,568,478

[45] Date of Patent: Oct. 22, 1996

[54] SYSTEM FOR PROCESSING DATA STRUCTURES IN A NODE OF A COMMUNICATION NETWORK

[75] Inventors: Gerrit J. van Loo, Jr., Heerlen, Netherlands; Joachim Noll, Aachen; Andreas Schwope, Würselen, both of Germany

[73] Assignees: ATecoM GmbH, Germany; Ascom Tech AG, Switzerland

[21] Appl. No.: 275,000

[22] Filed: Jul. 13, 1994

[30] Foreign Application Priority Data

Jul. 14, 1993 [DE] Germany .................. 43 23 471.2

[51] Int. Cl.⁶ .................................. H04L 12/54
[52] U.S. Cl. ................. 370/60.1; 370/82; 370/94.2
[58] Field of Search ................ 370/58.1, 58.2, 370/58.3, 60, 60.1, 79, 82, 83, 94.1, 94.2

[56] References Cited

U.S. PATENT DOCUMENTS

| | | | |
|---|---|---|---|
| 5,271,010 | 12/1993 | Miyake et al. | 370/94.1 |
| 5,287,530 | 2/1994 | Davis et al. | 370/94.1 |
| 5,321,691 | 6/1994 | Pashan | 370/58.3 |
| 5,323,389 | 6/1994 | Bitz et al. | 370/60.1 |
| 5,394,393 | 2/1995 | Brisson et al. | 370/60 |

*Primary Examiner*—Douglas W. Olms
*Assistant Examiner*—Russell W. Blum
*Attorney, Agent, or Firm*—Blakely Sokoloff Taylor & Zafman

[57] ABSTRACT

All the information sections of a processed data structure, including pre-header, tail and extra section, header and payload, can be selectively copied in a node of a communication network by means of a copy mask (12) associated with a copy block (11). A combination of an insert block (14) and an insert mask (15) is used for selectively writing to all the information sections in the data structure. In order to increase the capacity of the data structure, the length of the pre-header or tail can be increased. In the path between an input interface (10) and the insert block (14) there is an adjustable delay block (13) into which the data structure can be copied as a whole. A microprocessor (25) is coupled to all the processing units (10)–(17) and (22)–(24) of the system and serves for presetting the two masks for selecting the information to be copied and inserted.

18 Claims, 3 Drawing Sheets

SYSTEM FOR PROCESSING DATA STRUCTURES IN A NODE OF A COMMUNICATION NETWORK

BACKGROUND OF THE INVENTION

1. Area of the Invention

The invention relates to the area of information communication and more particularly the processing of binary data structures on their passage through a node of a communication network.

2. Prior art

An ATM (asynchronous transfer mode) layer is used for the transmission of short information packets, known as ATM cells, from a transmission station to a destination station. Known ATM cells are packets of fixed lengths and comprise a header followed by a payload (Jean-Yves Le Boudec in the article "The Asynchronous Transfer Mode: a tutorial" in Computer Networks and ISDN Systems 24 (1992), pages 279–309). The total length of the cells is in each case 53 bytes, the header containing 5 bytes and a payload 48 bytes. Because of the fixed and small size of the cell the cell routing information contained in the header is a tag and not an explicit address. When a switching unit (hereinafter referred to as a node) reads an incoming cell with the route tag m at an input port, it determines an output port j and a tag n from a route switching table. The cell is then written to the output port j and receives the new tag n. The next switching unit extracts corresponding information etc from the new tag n. The route switching tables must be preset or dynamically allocated. The transport of all the cells takes place via one connection.

Translators are also known which can perform the pure header translation in the ATM layer and are additionally able to attach to the ATM cell route information for switching the individual information packets.

In the known ATM systems there is in principle no fixed definition of a data rate, but only the inputting of a maximum data rate on a connecting line. The data rate of a given connection on such a line is defined as the number of cells per unit of time. There is no frame structure on a line of this kind, so that it is not possible to allocate cells to a connection over a fixed time raster. The header data must therefore be newly processed from one cell to another, and it is impossible to predict when the next cell for an existing connection will arrive.

The invention

The object of the invention is substantially to enlarge the possible applications of an ATM system. More particularly, it is an object of the invention to provide the possibility of enabling data to be extracted and inserted on the transmission of information packets through an ATM layer.

To this end, according to the invention, the copy means has an associated first mask for selectively copying all the information sections of the processed data structure, including pre-header and/or tail and/or extra section and payload of the ATM cell, and the insert means has an associated second mask for selectively writing the ATM cell in its payload and header and/or in, at least one of the pre-header, tail or extra sections of the binary data structure.

The method of processing a binary data structure containing an ATM cell on its passage through a node of a communication network is characterised in that a) a data structure is used which has at least one additional information section in the from of a pre-header and/or tail and/or extra section, the pre-header and/or tail and/or extra section being selectively adjustable (programmable);

b) in that the payload and/or header section of the ATM cell and/or at least one of the pre-header, tail or extra sections is selectively copied via a first mask; and c) in dependence on the copy operation according to step b) at least one of the information sections consisting of the payload, cell header, pre-header, tail and extra section is selectively written and/or removed via a second mask means.

In the invention, the switching nodes are so constructed that any data can be read selectively bit-wise, byte-wise or even portion-wise via the first mask. Internal or external tables can be addressed with the extracted data. Via the second mask the data structure can again selectively be inserted, added to or erased at any place. Thus even if incorporated in a conventional ATM layer network each node acquires an independent facility to act on content, format and routing. Any desired bits and bytes can be extracted and/or inserted and/or overwritten on the fly. The sources for data for insertion may be not only external tables but also internal or external components, external algorithms, which are implemented, for example, in a form of integrated circuits, and also internal tables and memories. On the other hand, the processing system constructed according to the invention can without difficulty switch ATM cells conventionally, i.e. copy and translate just the header, while all the data in the payload remains untouched.

In a preferred aspect of the invention, the second mask and the associated insert means are provided with means for changing the length of a pre-header and/or of a tail. This includes the possibility of attaching a pre-header and/or tail to an ATM cell. The same applies to an extra addition, the length of which preferably corresponds to the length of the ATM cell with a pre-header and/or tail.

To permit "on the fly" insertion of data into the data structure, in another aspect of the invention, a delay means into which the data structure can be copied undivided is provided in the path between the input interface and the insert means. Preferably, the delay means is provided with means for adjusting the delay.

In this way it is possible to delay inputting the undivided data structure into the insert means until the data for insertion and/or attachment have been extracted from internal and/or external sources and are available for the writing of the data structure passing through.

Each node provided with the system according to the invention is preferably allocated a microprocessor which is coupled to all the processing units of the system and is so constructed that before starting to process the cell stream it selects the input and output interfaces, resets the copy and insert means, sets the first and second masks for selection of the information for copying and insertion and, where applicable, presets the delay time of the delay means.

In a development of the invention, the possible applications can be further enhanced if clock decoupling means are incorporated between the insert means and the output interface.

Other advantageous aspects of the invention are characterised in the subclaims.

The invention is explained in detail hereinafter with reference to examples and the accompanying drawings.

DETAILED DESCRIPTION OF THE INVENTION

Figure 1:
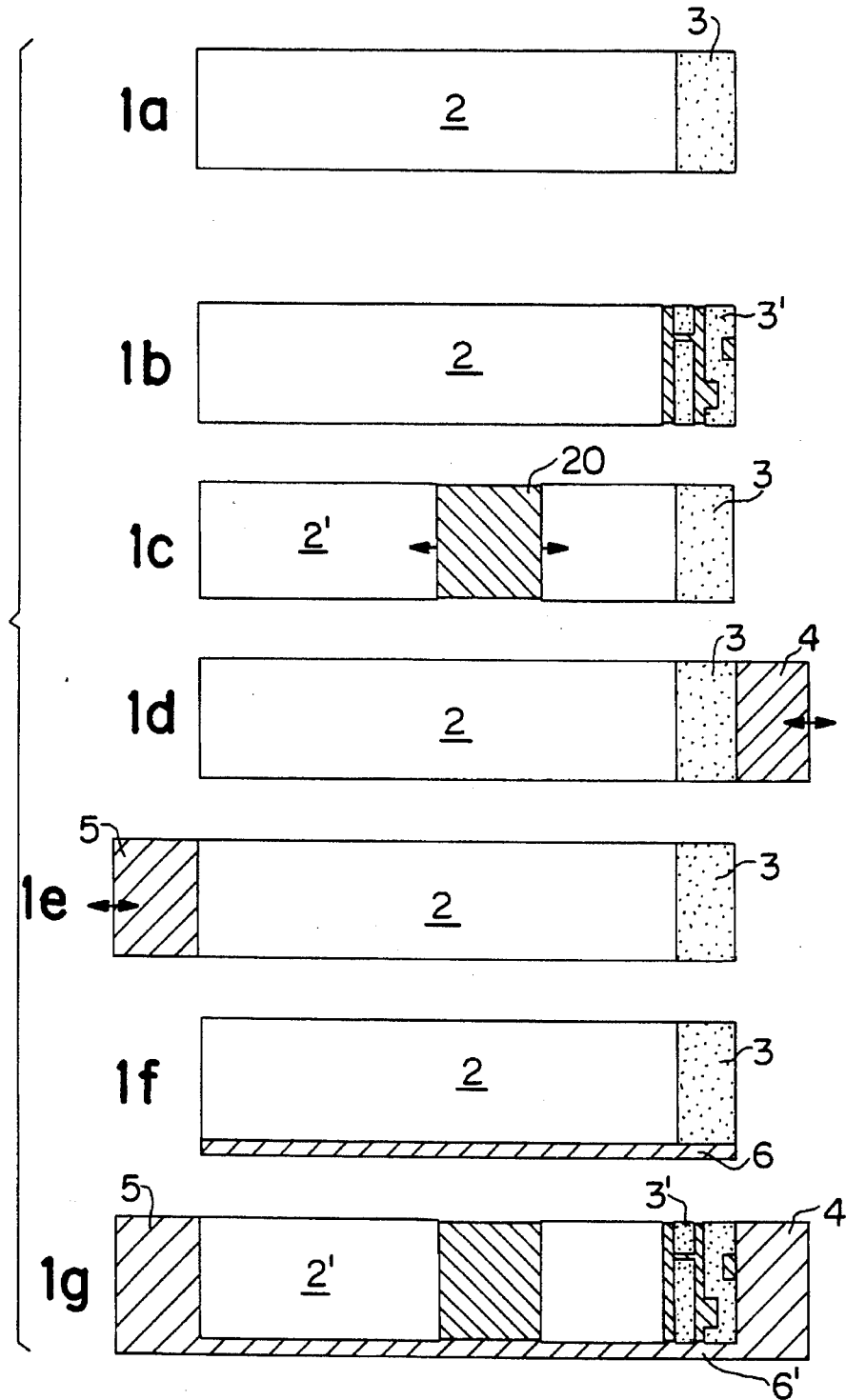
FIG. 1 diagrammatically illustrates various binary data structures including a conventional ATM cell and, in contrast, modified data structures in explanation of the processing facilities offered by the invention.

FIG. 1 is a diagram showing a conventional ATM cell 1a on entry into a Switching node of a network, while the FIGS. 1b to 1g show modified data structures obtained in the node from the ATM cell according to FIG. 1 after processing according to the invention.

The ATM cell 1a shown in FIG. 1 is a data packet having a width of 8 bites, a payload 2 of 48 bytes and a header 3 with a length of 5 bytes. This conventional ATM cell can, of course, also be conventionally processed in the node according to the invention by reading the header 3 at the input port and determining an output port from a route switching table and inserting a new tag in the header. No change of the payload 2 takes place in these conditions.

Reference 1b denotes a data structure processed in the system according to the invention as described hereinbelow, wherein bits and bytes have been changed in the header 3'. It will be seen that the length (and the width) of the cell 1b is unchanged.

In the data structure 1c, the bytes denoted by reference 20 have been changed in the payload 2'. The arrows extending to either side are intended to show that the change Of the bytes in the payload 2' can be enlarged or reduced or be distributed discontinuously over the payload 2' in accordance with a suitable mask.

In the data structure 1d, a pre-header precedes the header 3 and its length is selectively adjustable by means of an insert mask. This is explained in greater detail with reference to FIG. 3. In the data structure 1e, a tail 5 which is also selectively adjustable has been attached; otherwise the ATM cell with the payload 2 and the header 3 remains unchanged.

In the data structure 1f, a parallel section 6 of a width of 2 bits is associated with the data structure 1a on the input side and extends over the full cell length.

Finally, the data structure 1g combines all the processing possibilities as explained above with reference to the data structures 1b to 1f.

Figure 2:
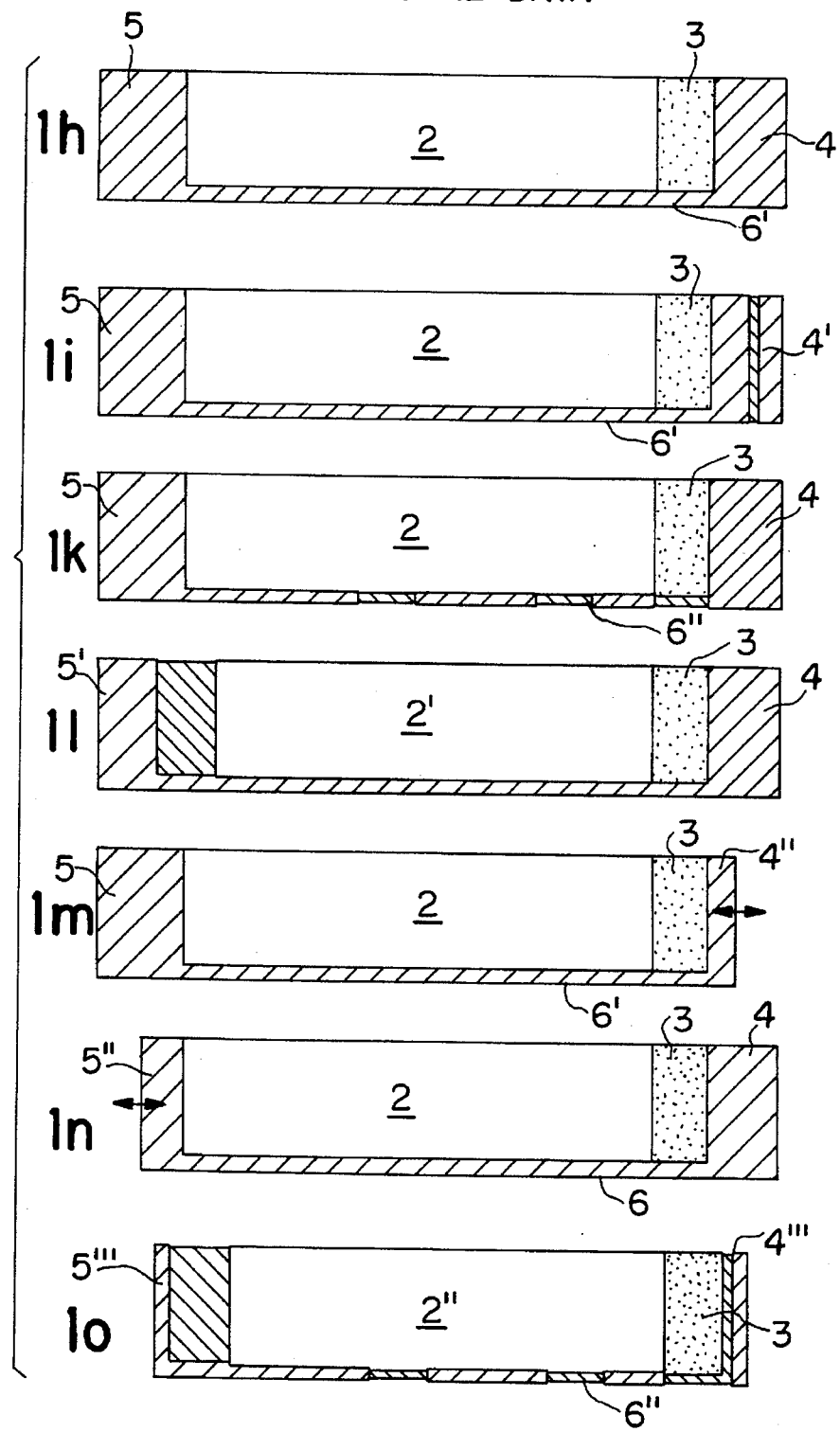
FIG. 2 illustrates a special data structure and processing thereof according to the invention.

FIG. 2 shows a Special data structure 1h on its entry to the switching node and data structures 1i to 1o which are offered at the output of the node in each case after different processing with a system according to the invention.

The core of the Special data structure 1h is the ATM cell (1a) with the payload 2 and the header 3. Pre-header 4, tail 5 and extra bits 6' are additionally provided.

The data structure 1i has a changed pre-header 4'. The data in all the other sections of the data structure 1i correspond to those of the data structure 1h.

In the data structure 1k, various four-bit units have been changed in the extra section 6". These are shown in black in the exemplified embodiment illustrated.

In the data structure 1l, the data of the payload have been changed by the system according to the invention, the payload 2' being extended at the expense of the tail 5'.

In the data structure 1m and 1n, the pre-header 4" and the tail 5" respectively have been shortened, the format of the total cell being changed.

Compared with the data structure 1h on the input side, the data structure 1g has simultaneously undergone various alterations. The amended data are also shown in black here.

Implementations and possible applications of the different data structures will be described below in connection with FIG. 3.

Figure 3:
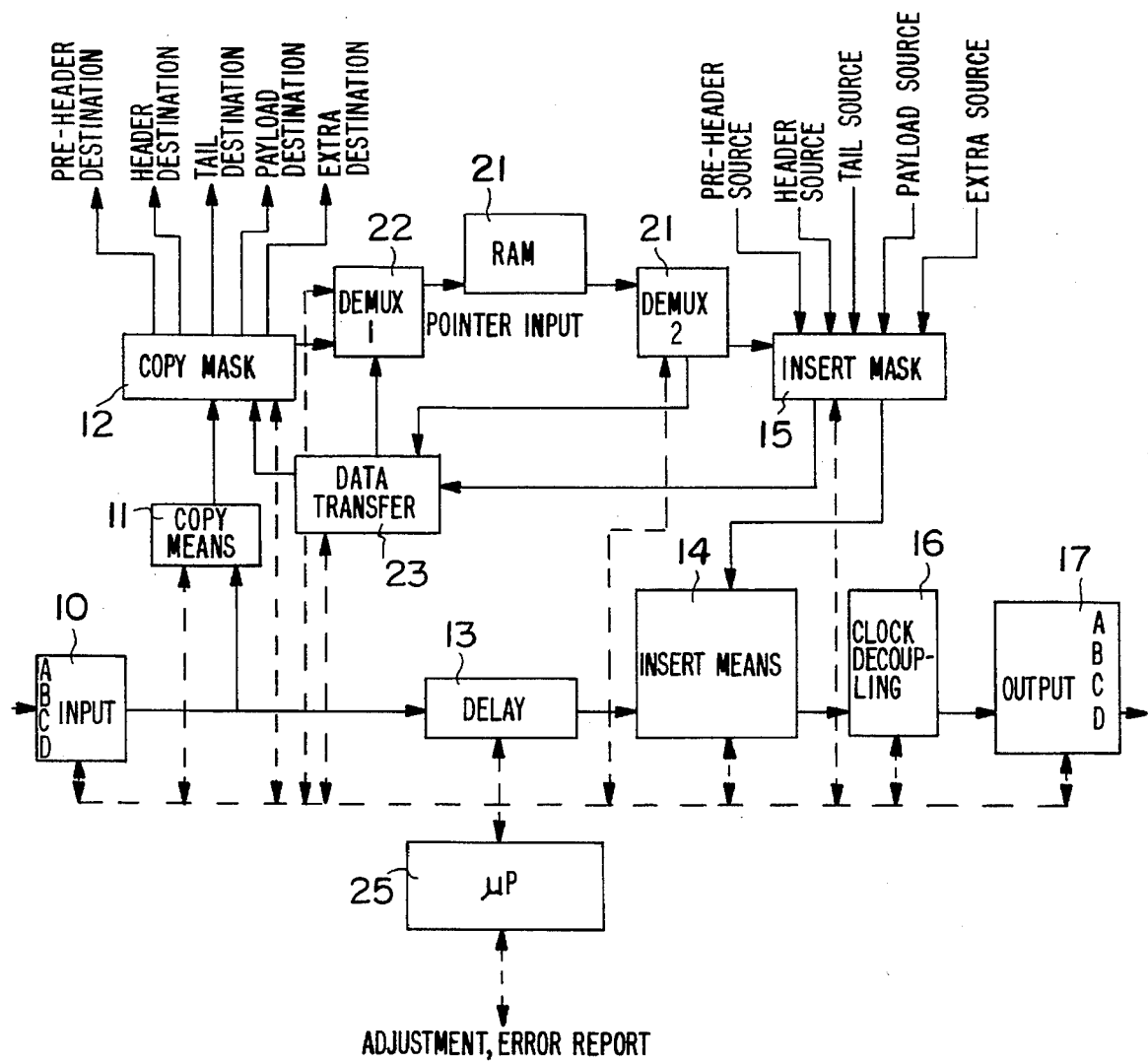
FIG. 3 is a block schematic diagram of one exemplified embodiment of the processing system according to the invention.

The exemplified embodiment of the processing system according to the invention as shown diagrammatically in FIG. 3 comprises the following components: an input unit 10 with a plurality of interface types A, B, C and D, a copy means 11 with a copy mask 12 associated therewith, a delay means 13 following the input unit 10 in the path of the cell stream, an insert means 14 following the delay means 13 and having an associated insert mask 15, a clock decoupling means 16 disposed in the output path Of the processed data structures, and an output unit 17 with interface types A, B, C and D.

The node shown in FIG. 3 also comprises an internal RAM 21 which is connected to the copy mask 12 and a data transfer means 23 via a first demultiplexer 22, and to the insert mask 15 and the data transfer means 23 via a second demultiplexer 24.

A microprocessor 25 is coupled to all the processing units, i.e. units 10–27 and 22–24. Before processing starts its main function is to select the input and output interfaces in the input 10 and output 17, reset the copy and insert means 11 and 14, adjust the copy and insert masks 12 and 15 for selection of the information to be copied and inserted, and where applicable actuate the delay means 13 to adjust the delay time. Other functions of the microprocessor 25 and associated components are described hereinafter.

The copy mask 12 in the exemplified embodiment illustrated is coupled to various destination components, namely a pre-header destination, a header destination, a tail destination, a payload destination and an extra section destination. The second or insert mask 15 is correspondingly connected to a pre-header source, a header source, a tail source, a payload source and an extra section source, which, as external units, supply the insert means 14 with data for writing or insertion after selection via the insert mask 15.

The system shown diagrammatically in FIG. 3 offers a practically universal process facility for an ATM cell stream.

With the aid of the combination of the copy means 11 and copy mask 12 it is possible selectively to copy data from one or more data sections 2, 3, 4, 5 and 6 as required. The data copied or extracted from the data stream may vary from 8 bits up to a complete cell. The copied data can, if required, be used to select or generate data inserted into the data structure by means of the combination consisting of the insert mask 15 and the insert means 14.

The system shown in FIG. 3 is able selectively to insert or, if required, remove data in all the sections 2–6 of each data structure selectively by means of the insert mask and insert means 15 and 14. There are no limitations as to the length of the data for insertion: a single bit, any desired bit sequence and even a complete Cell can be inserted. The data for insertion may be obtained from an internal memory 21 or from external sources and/or they can be re-inserted from previously copied data. The cell data can also pass through the node unchanged up to the header data.

Idle cells can be generated at the output 17. By means of an input pin (not shown in the drawing), the system shown in FIG. 3 call be used to generate an idle cell even when a correct cell is to be output. The extra section 6, 6' and 6" in the data structures 1f to 1o serves primarily for the transport of additional data which cannot be transmitted otherwise if the payload 2 is occupied. For this purpose, 53 or 106 bits (in the case of a length corresponding to the ATM cells) can be additionally accommodated in the extra section 6, depending on whether the extra section is given a width of 1 or 2 bits. The additional information can be extracted from an extra data source via the insert mask 15. Of course the same applies to data to be inserted into the pre-header and tail and into the header 3 and payload 2. The insert mask provides the possibility of selecting the information sections affected by the insert operation and selection of the individual bits or bytes.

The pre-header 4 and tail 5 can also serve for the transport of additional data, like the extra section, if the payload 2 is already completely occupied by data. The pre-header and tail, however, are particularly suitable for receiving test, check and route information. The bytes inserted in the pre-header or tail (a maximum of 15 bytes in the exemplified embodiment described), need not all be inserted at one node. On the contrary, one or more bytes can precede the incoming data structure at successive nodes in the path of the cell stream.

In association with the mask the system described has in each case a start register and an information section length register. At the places designated by the start register, bytes are inserted according to the setting of the corresponding length register. The values of the start and length registers must be smaller than or equal to the format of the associated information section, whether it is the pre-header, payload, tail or extra section.

Normally, the system described provides replacement of data from an incoming cell. When the user wishes to insert a new cell into the data stream, sufficient space must additionally be made available in the data stream to receive the cell. A suitable request signal can be applied for this purpose to the system shown in FIG. 3. The system monitors the data stream on the basis of this signal. As soon as sufficient space for insertion of the new cell is available, the system develops a "gap" signal. The copy unit 11 is deactivated while the insert unit 14 inserts the cell into the data stream. The data transfer means 23 serves to update externally connected sources or the internal RAM of the node. The sources are read by the system on passage of a data structure as required and according to the result of the copy operations via the copy means 11. Means are also provided to fill the tables with new or correct data or to verify the correctness of their contents from time to time. The data transfer means 23 has the following functions: selection of an updating interval; application of address to the copy port; copying data from a source; and inserting data into a source. A control register (not shown in the drawing) is provided to start a transfer. The internal RAM 21 in the exemplified embodiment described has 256 entries each of 8 bits. This small capacity is sufficient to allow utilisation of the system according to the invention in numerous applications even without external components. The RAM can be activated during copying of the payload 2, header 3 and pre-header 4. The signal break is controlled by the RAM 21. The user can select different address sources for the RAM via the internal RAM control register (not shown).

As stated above, the delay means 13 between the input unit 10 and the insert means 14 is adjustable via the microprocessor 25 for the insertion of user-selectable delay times. No long delay time is required in the case of simple copying or writing. If, however, the data to be inserted into the data structure are dependent on the copied data, a comparatively much longer time may be necessary for processing the copied data and, in dependence thereon, generating new data to be inserted. In such a case, a data structure is delayed for a relatively long time in the delay unit 13 to ensure that all the data for insertion are available at the insertion means before the data structure is output from the delay means 13.

According to a specific development of the invention, means are provided for checking the data transmission between the microprocessor 25 and processing components of the system described. This check takes place by means of a "double write" mode, activated by a common control register. In this the register is written twice. Initially the register is written with the correct data and the second time all the data and register address bits are inverted. The two data units and the register address are compared. Only when all the data are correct and valid are they transmitted to the internal register. Various errors in writing data are avoided in this way.

The sequence of Operations of the system shown in FIG. 3 will be described below briefly with reference to one example.

Before the data structures are processed, the microprocessor must be initialised for preparation of the operational phase. For this purpose, the interfaces are selected at the input and output units 10 and 17, the copy and insert units are reset and the copy and insert masks are set to the data structure for processing. Let it be assumed that in the data structure 1i according to FIG. 2 the pre-header 4 is to be changed by inserting a byte. (In addition, the system must copy the header tag 3 and provide it with the new ATM address information.) The internal RAM 21 is written with correct values via the data transfer means 23. In operation they serve as new header information. The delay means is set to a relatively short delay of 20 cycles in respect of the required operation.

The cell with the pre-header, tail and extra section is copied byte-wise the copy means 11 and then copied as an undivided data structure into the delay means 13. The copy means 11 copies the bytes 3 and 4 from the header 3 of the ATM cell in accordance with the copy mask 12 and applies these bytes as a pointer to the internal memory 21 via the demultiplexer 1. After the application of this address information and a given reaction time (which is less than the preset delay time of 20 cycles), the memory delivers information as header information to the insert means 14 via the demultiplexer 24 and the insert mask 15. The insert means 14 again addresses the bytes 3 and 4 for writing the header. In parallel, the byte 3 of the pre-header 4 is copied by the copy means 11. The information to be inserted at the appropriate place is fed by the insert mask to the insert means either from the internal RAM 21 or from an external pre-header source and the pre-header is written in accordance with the processed data structure.

After passing through the clock decoupling stage 16, the changed data structure (1i in FIG. 2) is fed to the output unit 17 and is inserted byte-wise via the interface mode A. The copy and insert mask means 12 and 15 are so set for this operation that data are transmitted unchanged in the tail and extra sections and in the payload 2.

If one of the processing units records an error during its data processing phase, it delivers an error report signal to the microprocessor 25. Signals of this kind are deposited in suitable intermediate memories. Error reports are transmitted by the microprocessor to an external monitor which evaluates such error reports and transmits suitable commands to the processing units via the microprocessor. If a cell or data structure is deposited after faulty attempts during a test mode, then an idle cell can be output via the output unit 17 instead.

As stated above, a clock decoupling stage is incorporated in the data stream connection path downstream of the insert means 14. As a result, the output rate can without difficulty be made higher than the input rate.

We claim:

1. In a communication network containing a plurality of nodes for switching binary data structures, a method of processing a binary data structure comprising an ATM (asynchronous transfer mode) cell, said ATM cell consisting of a header and a payload, said binary data structure further comprising at least one additional information section selected from a group consisting of a tail following said payload and a parallel information field extending in parallel to said ATM cell;

said method comprising the following steps:

a) inputting said binary data structure via an input interface into one of said nodes;

b) selective copying of said header, said payload and said at least one additional information section by a first mask;

c) selectively writing said header, said payload and said at least one additional information section by means of a second mask;

d) outputting said binary data structure via an output interface.

2. The method of claim 1 wherein said at least one additional information section is a parallel information field extending in parallel to said ATM cell.

3. The method of claim 1 or 2, wherein the data structure is delayed undivided after copying until all the data required for writing in step c) are available.

4. The method of claim 3, wherein the data required in step c) are made available defending on the selective copying of at least one information section.

5. The method of claim 4, characterized in that the header, payload, and additional information section selectively read in step b) are at least partially used as a pointer for an internal memory and in that data from the internal memory as indicated by the pointer are selectively written in step c).

6. The method of claims 1 or 2, characterized in that in an initialization phase before processing of the binary data structure, the input and output interfaces are selected, a first mask used for selective copying and a second mask used for selective writing are preset to copying and writing, respectively, of at least one information section from said payload and/or said header of the ATM cell, said tail and/or said parallel information field, and in that at least one internal source and/or at least one external source is selected as a data source for the writing operation.

7. In a communication network containing a plurality of nodes, a system for processing a binary data structure, said binary data structure comprising an ATM (asynchronous transfer modes) cell consisting of a header and a payload, said binary data structure further comprising at least one additional information section selected from a group consisting of a tail following said payload and a parallel information field extending in parallel to said ATM cell, said system associated with one of said nodes for processing said ATM cell and comprising:

a) an input interface for receiving said binary data structure, b) a copy means having a first masking means for selectively copying said header, said payload and said at least one additional information section of said data structure, c) an insert means having a second masking means for selectively writing said payload, said header and said at least one additional information section, and d) an output interface for outputting said binary data structure, whereby each of said header, said payload, and said at least one additional information section can be selectively copied and written independently from each other.

8. The system of claim 7, wherein said at least one additional information section is a parallel information field.

9. The system of claim 7 or 8, further comprising a delay means into which said data structure can be copied undivided is provided between said input interface and said insert means.

10. The system of claim 9, wherein said delay means is provided with means for adjusting the delay.

11. The system of claim 10, comprising a microprocessor coupled to said input interface, said copy means, said insert means, said output interface, and said delay means for selecting said input and output interfaces, for resetting said copy and insert means, for adjusting said first and second masking means for selection of information to be copied and inserted and for presetting a delay time for said delay means.

12. The system of claim 11, comprising an internal memory connected, on the one hand, via a first demultiplexer to said first masking means and, on thee other hand, via a second demultiplexer to said second masking means and wherein a pointer is set in said memory by means of said first masking means and wherein an entry at a position indicated by said pointer is inserted into said binary data structure via said second masking means.

13. In a communication network containing a plurality of nodes, a system for processing a binary data structure said binary data structure comprising an ATM (asynchronous transfer mode) cell consisting of a header and a payload, said binary data structure further comprising a pre-header and at least one additional information section selected from a group consisting of a tail following said payload and a parallel information field extending in parallel to said ATM cell and said pre-header, said system being associated with one of said nodes for processing said ATM cell and comprising:

a) an input interface for receiving said binary data structure, b) a copy means having a first masking means for selectively copying said header, said payload, said pre-header and said at least one additional information section of said data structure, c) an insert means having a second masking means for selectively writing said payload, said header, said pre-header and said at least one additional information section, and d) an output interface for outputting said binary data structure, whereby each of said header, said payload, said pre-header, and said at least one additional information section can be selectively copied and written independently from each other.

14. The system of claim 13, wherein said at least one additional information section is a parallel information field.

15. The system of claim 13 or 14, further comprising a delay means into which said data structure can be copied undivided is provided in the path between said input interface and said insert means.

16. The system of claim 15, wherein said delay means is provided with means for adjusting the delay.

17. The system of claim 16, comprising a microprocessor coupled to said input interface, said copy means, said insert means, said output interface, and said delay means for selecting said input and output interfaces, for resetting said copy and insert means, for adjusting said first and second masking means for selection of information to be copied and inserted, and for presetting a delay time for said delay means.

18. The system of claim 17, comprising an internal memory connected, on the one hand, via a first demultiplexer to said first masking means and, on the other hand, via a second demultiplexer to said second masking means and wherein a pointer is set in said memory by means of said first masking means and wherein an entry at a position indicated by said pointer is inserted into said binary data structure via said second masking means.

* * * * *